J. Cluckner,
Cultivator.
No. 109,984. Patented Mar. 22, 1870.
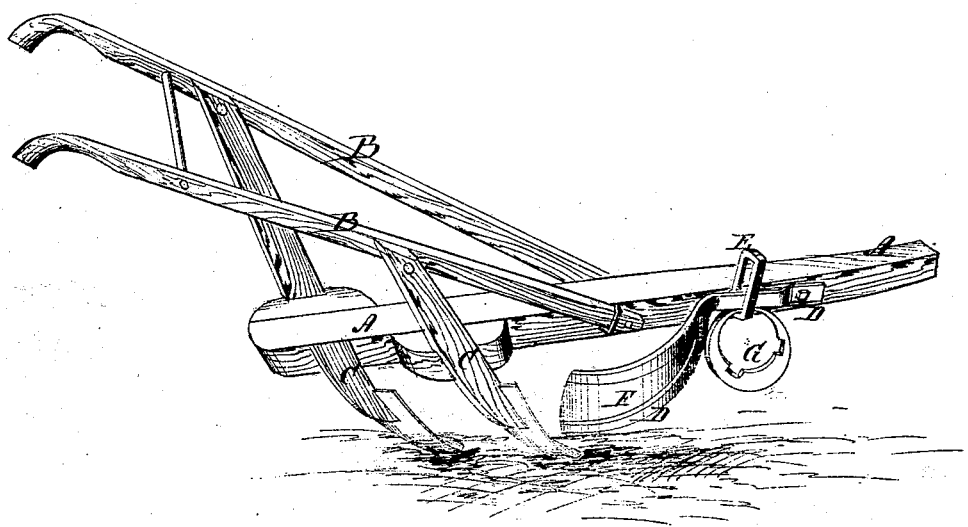
Witnesses:
Alex T. Roberts
Wm A Morgan
Inventor:
J. Cluckner
PER Munn & Co
Attorneys.

UNITED STATES PATENT OFFICE.

JOSEPH CLUCKNER, OF ARCADIA, INDIANA.

IMPROVEMENT IN DIRT-GAGES FOR PLOWS.

Specification forming part of Letters Patent No. 100,984, dated March 22, 1870.

*To all whom it may concern:*

Be it known that I, JOSEPH CLUCKNER, of Arcadia, in the county of Hamilton and State of Indiana, have invented a new and useful Improvement in Dirt-Gages for Plows; and I do hereby declare that the following is a full, clear, and exact description thereof, which will enable others skilled in the art to make and use the same, reference being had to the accompanying drawing, forming part of this specification, in which the figure is a perspective view of a plow to which my improved gage has been attached.

My invention has for its object to furnish an improved dirt-gage for plows, which shall be so constructed that it may be readily adjusted to allow less or more dirt to pass to the plants as their size may render advisable; and it consists of the guard-loop or keeper and adjusting-ring, in combination with the beam or frame-work of the plow or cultivator, as hereinafter more fully described.

The dirt-gage may be attached to any ordinary plow or cultivator.

A represents the plow-beam or cultivator-frame, to which the handles B and plow-standards C are attached in the ordinary manner.

D is a bar, the forward end of which is pivoted to the side of the forward part of the beam or frame A. As the bar D passes back, it passes through a long guard-loop or keeper, E, attached to the side of the said beam or frame A. As the bar D passes back from the guard-loop or keeper E, it is bent or curved outward and rearward, and extends back to or nearly to the plow that is nearest to the plants being cultivated. At or near the point where the bar D begins to curve outward and rearward it is forked, as shown in the figure, and to its branches upon their inner or concave sides is attached a sheet-iron plate, F, as shown in the figure.

G is a ring placed in the guard-loop or keeper E beneath the lower edge of the bar D. The ring G varies in thickness, and has several notches formed in its inner or concave edge, to receive the keeper or loop E, so that the said ring may remain in any position into which it may be adjusted. This construction enables the dirt-gage to be adjusted by simply turning the adjusting-ring G from one notch to another, so that the gage may be lowered when the plants are small, to keep them from being covered or injured by the dirt, while allowing the plow to work close to the plants, so as to cover the small grass and weeds. As the plants increase in size, the gage may be gradually raised to admit more and more dirt around the plants.

Having thus described my invention, I claim as new and desire to secure by Letters Patent—

The gage D F, guard-loop or keeper E, and adjusting-ring G, in combination with each other and with the plow beam or frame, said parts being constructed and operating substantially as herein shown and described, and for the purpose set forth.

The above specification of my invention signed by me this 22d day of October, 1869.

JOSEPH CLUCKNER.

Witnesses:
JOHN FITZPATRICK,
H. B. SANDERS.